(12) United States Patent
White

(10) Patent No.: US 8,083,246 B2
(45) Date of Patent: Dec. 27, 2011

(54) PLATED BICYCLE FORK STEERER TUBE

(76) Inventor: Philip White, Toronto (CA)

( * ) Notice: Subject to any disclaimer, the term of this patent is extended or adjusted under 35 U.S.C. 154(b) by 0 days.

(21) Appl. No.: 12/585,670

(22) Filed: Sep. 21, 2009

(65) Prior Publication Data
US 2010/0090438 A1    Apr. 15, 2010

Related U.S. Application Data

(60) Provisional application No. 61/136,616, filed on Sep. 19, 2008.

(51) Int. Cl.
*B62K 19/02* (2006.01)
(52) U.S. Cl. ...................................................... 280/279
(58) Field of Classification Search ............... 280/279, 280/276
See application file for complete search history.

(56) References Cited

U.S. PATENT DOCUMENTS

| | | | |
|---|---|---|---|
| 4,092,025 A | | 5/1978 | Yanagioka |
| 4,188,032 A | | 2/1980 | Yanagioka |
| 5,762,352 A | | 6/1998 | Lee |
| 6,924,021 B1 | * | 8/2005 | Colegrove et al. ............. 428/81 |
| 7,503,576 B1 | * | 3/2009 | Schroeder .................... 280/280 |
| 7,543,835 B2 | * | 6/2009 | Murphy et al. ............... 280/276 |
| 2005/0051993 A1 | * | 3/2005 | Ito et al. ....................... 280/276 |
| 2006/0135281 A1 | | 6/2006 | Palumbo et al. |
| 2006/0160636 A1 | | 7/2006 | Palumbo et al. |
| 2009/0058039 A1 | * | 3/2009 | Mickelson .................... 280/276 |

FOREIGN PATENT DOCUMENTS

| | | |
|---|---|---|
| EP | 0 063 719 A | 11/1982 |
| GB | 2445 554 A | 7/2008 |
| WO | WO 2004/020510 A | 3/2004 |

* cited by examiner

*Primary Examiner* — Paul N Dickson
*Assistant Examiner* — Tashiana Adams

(57) ABSTRACT

The present invention is directed to a bicycle fork steerer tube of fibre composite material with a layer of metal circumferentially about the exterior of the fibre composite material. The layer of metal assists in wear resistance and increases strength.

20 Claims, 4 Drawing Sheets

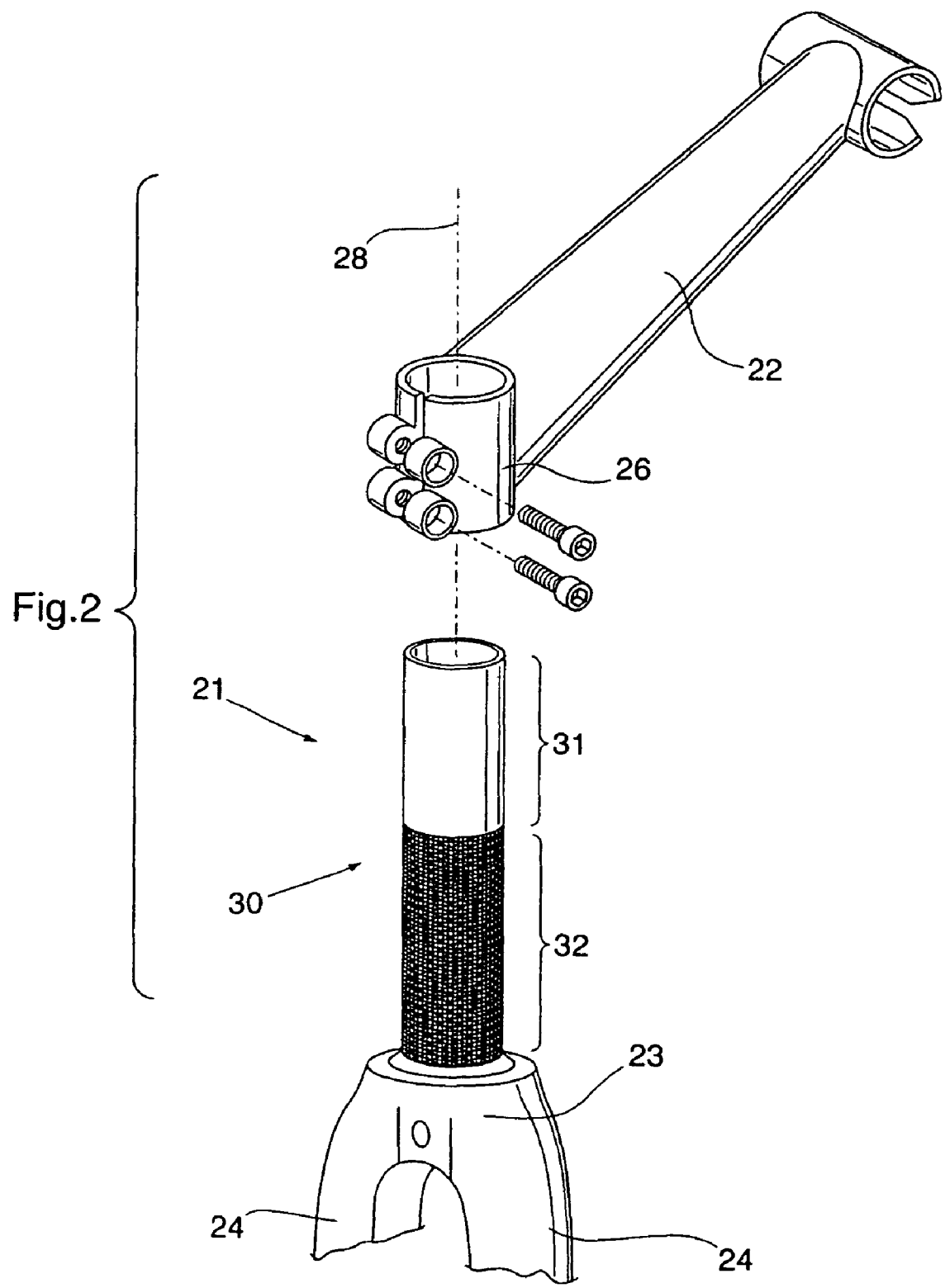

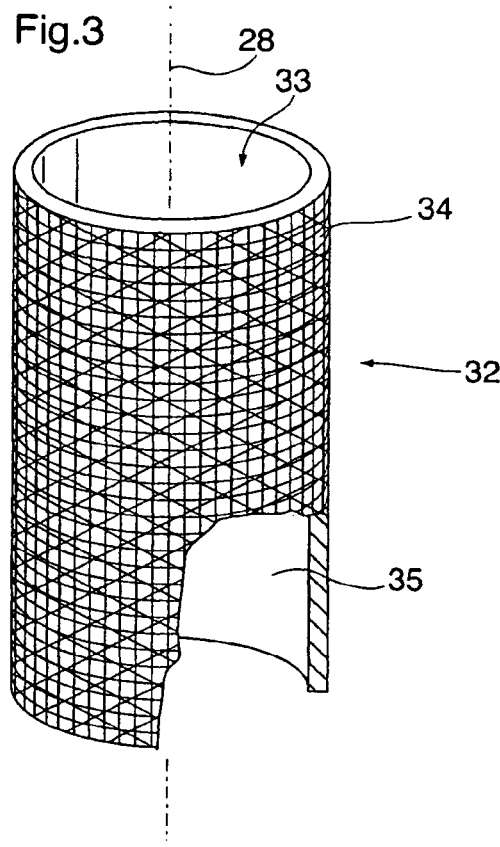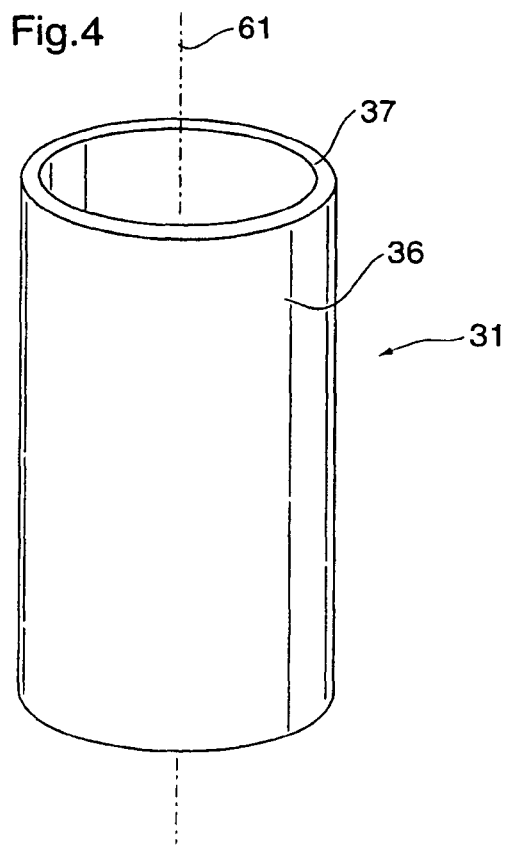

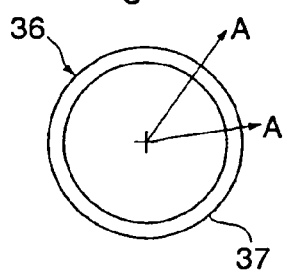
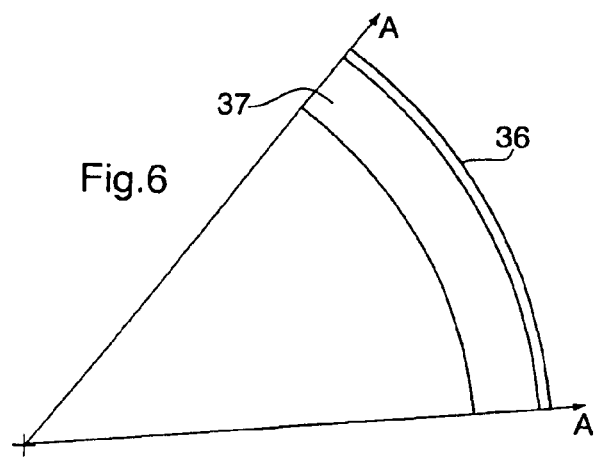
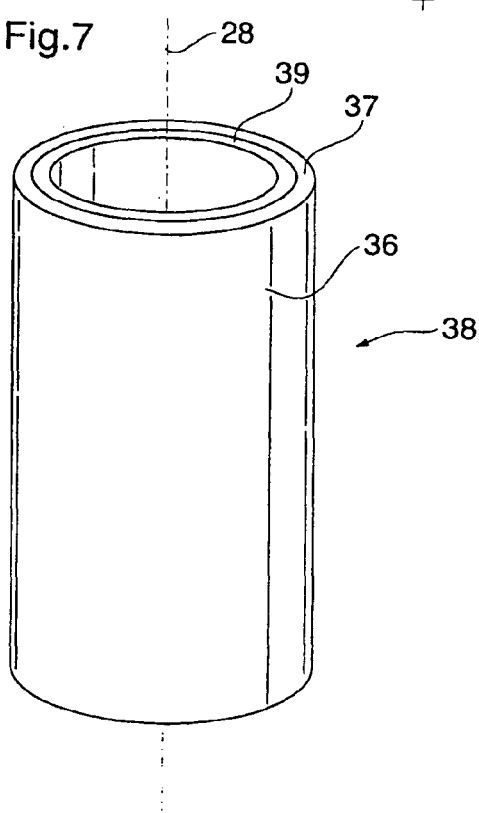

PLATED BICYCLE FORK STEERER TUBE

This application claims as under 35 U.S.C. 119 of U.S. Provisional Patent Application Ser. No. 61/136616 filed Sep. 19, 2008.

FIELD OF THE INVENTION

The present invention relates to a bicycle fork steerer tube of a bicycle fork wherein the bicycle fork steerer tube includes non-metallic material, and more particularly to providing such a bicycle fork steerer tube to be plated with a metal or metal alloy as to advantageously change the properties of the non-metallic material, as for example to increase strength and wear resistance.

BACKGROUND OF THE INVENTION

Bicycle racing is a highly competitive sport where riders are competing for the best possible times. Bicycles are being designed to assist the riders to achieve their best. One way to assist the rider is to design a bicycle that is as light as possible without losing the stiffness, strength or wear resistance.

In the past, bicycle fork steerer tubes were made out of metal. Bicycle fork steerer tubes were originally typically made out of steel but as more emphasis was placed on reducing the weight of bicycles some bicycle fork steerer tubes were made out of aluminum. Metal bicycle fork steerer tubes are both strong and resilient but do not provide as lightweight a design as is desired for bicycle racing.

To further reduce the weight of bicycles, some bicycle fork steerer tubes have been constructed out of non-metallic materials including notably carbon fibre and various fibres or combinations of fibres such as glass, Kevlar and carbon. These various fibres are placed in a polymer or other matrix to form the bicycle fork steerer tube structure. Such fibre composite bicycle fork steerer tubes can be lighter weight than traditional metal bicycle fork steerer tubes.

While fibre composite bicycle fork steerer tubes are lighter, the fibre composite bicycle fork steerer tubes suffer the disadvantage that they do not have all of the beneficial properties of the metal tubes including the strength, rigidity or wear resistance. The reduction in strength and wear resistance can cause the fibre composite bicycle fork steerer tube to be damaged more easily than the metal bicycle fork steerer tubes. Furthermore, the fibre composite bicycle fork steerer tubes have the disadvantage that they are prone to failure if the surfaces of the tubes are damaged. These factors can disadvantageously affect the performance, reliability and length of service of the fibre composite bicycle fork steerer tubes.

Bicycle fork steerer tubes are designed so that bicycle handlebars and other suitable devices can be clamped to the bicycle fork steerer tube. When the clamp is tightened around the bicycle fork steerer tube high loads are created on the steerer tube weakening the structure, such loads typically include point loads created at the location where the clamp is tightened potentially causing damage.

While fibre composite materials can create strong structures, the strength depends on the direction of the fibres and they tend to be sensitive to point loads and impacts.

A metal tube, on the other hand generally has essentially equal strength characteristics in all desired directions and higher tolerance for impact and point loads, but typically will weigh more than a fibre composite tube.

SUMMARY OF INVENTION

To at least partially overcome these disadvantages of previously known devices, the present invention provides a bicycle fork steerer tube of composite materials where the exterior surfaces are plated with a metal or metal alloy.

An object of the present invention is to provide a relatively lightweight bicycle fork steerer tube that exhibits the strength, rigidity and wear resistance of a metallic tube.

The present invention is directed to a bicycle fork steerer tube made out of more than one material. In particular, the bicycle fork steerer tube is made of fibre composite material plated with a metal or metal alloy. The fibre composite material creates a light structure. The metallic or metal alloy coating on the outside of the structure which adds rigidity, and wear resistance and protects the fibres from damage, especially due to point loads and impacts.

The composite fibre portion of the bicycle fork steerer tube may be made of carbon fibre composite. The metallic or metal alloy portion may preferably be metal plating, more preferably a nano-grain metal alloy; more preferably the metal plating may be nickel plating. The metal plating need not extend the full-length of a bicycle fork steerer tube but may be only be a portion of the bicycle fork steerer tube where adjusted strength characteristics are desired.

Depending on the fork manufacturing technique the bicycle fork steerer tube may extend into the crown, in which case the plating may extend in the crown as well. The plating may also extend into the crown of the bike for ease of manufacturing.

The metal plating may be either uniform over a surface of the bicycle fork steerer tube or may vary in composition and/or thickness.

The present invention further provides a front fork of a bicycle having a bicycle fork steerer tube wherein the bicycle fork steerer tube comprises non-metallic material which is plated by a metal or metal alloy.

In a further aspect, the present invention provides a bicycle fork having a cylindrical steerer tube, a crown and a pair of fork arms for mounting of a front wheel therebetween,
the crown having the steerer tube extending upwardly therefrom to an upper distal end of the steerer tube,
the crown having the fork arms extending downwardly therefrom to lower distal ends of the forks,
the steerer tube adapted to extend through a bicycle frame to rotatably couple the fork to the bicycle frame,
characterized by:
the steerer tube having an inner tube of fibre composite material and
a layer of metal circumferentially about a section of the inner tube forming an exterior surface of the steerer tube over the section of the inner tube.

In a still further aspect, the present invention provides a steerer tube having proximate the upper distal end an upper clamp portion adapted for engagement by a clamp mechanism of a bicycle handlebar and the steerer tube having proximate the crown a lower journal portion adapted and to extend through the bicycle frame and be journalled therein,
the layer of metal circumferentially about at least one of the upper clamp portion and the lower journal portion.

In a further aspect, the present invention provides in combination with the bicycle frame and a handlebar;
the handlebar having a clamp mechanism for engagement circumferentially about the steerer tube;
the steerer tube above the crown having a lower journal portion and an upper clamp portion;
the steerer tube extending through a bicycle frame with the lower journal portion of the steerer tube journalled in the bicycle frame to rotatably couple the fork to the bicycle frame, the upper clamp portion extending upwardly past the bicycle frame;

the clamp mechanism removably securing the handlebars to the steerer tube against relative rotation and against removal by applying forces to the exterior surface of the steerer tube, the layer of metal circumferentially about at least one of the upper clamp portion and the lower journal portion.

The layer of metal can be circumferentially about one or both of the upper clamp portion and the lower journal portion.

The layer of metal on the steerer tube preferably has a thickness between 0.001 inches and 0.04 inches, and more preferably between 0.001 inches and 0.01 inches.

In a still further aspect, the present invention provides a inner tube having an internal surface and a second layer of metal circumferentially about a section of the internal surface of the inner tube.

The second layer of metal on the steerer tube preferably has a thickness between 0.001 inches and 0.04 inches, and more preferably has a thickness between 0.001 inches and 0.01 inches.

In a further aspect, the present invention provides a crown of fibre composite material and a layer of metal extending over the section of the crown forming an forming an exterior surface of the steerer tube over the section of the crown.

BRIEF DESCRIPTION OF THE DRAWINGS

Further aspects and advantages of the invention will become apparent upon reading the following description together with the company drawings in which:

FIG. 2 is an exploded partial perspective view of the front fork and handlebar stem of the bicycle of FIG. 1 showing its bicycle fork steerer tube;

FIG. 3 is a schematic perspective view of a short length of the composite bicycle fork steerer tube shown in FIG. 2 with a portion cut away;

FIG. 4 is a schematic perspective view of a short length of the plated composite bicycle fork steerer tube shown in FIG. 2;

FIG. 5 is a top view of the bicycle fork steerer tube of FIG. 4;

FIG. 6 is a enlarged view of the bicycle fork steerer tube of FIG. 5 over angular section A-A.

FIG. 7 is a schematic perspective view of a short length of a plated composite bicycle fork steerer tube with an additional internal layer.

DETAILED DESCRIPTION OF THE PREFERRED EMBODIMENT

Figure 1:
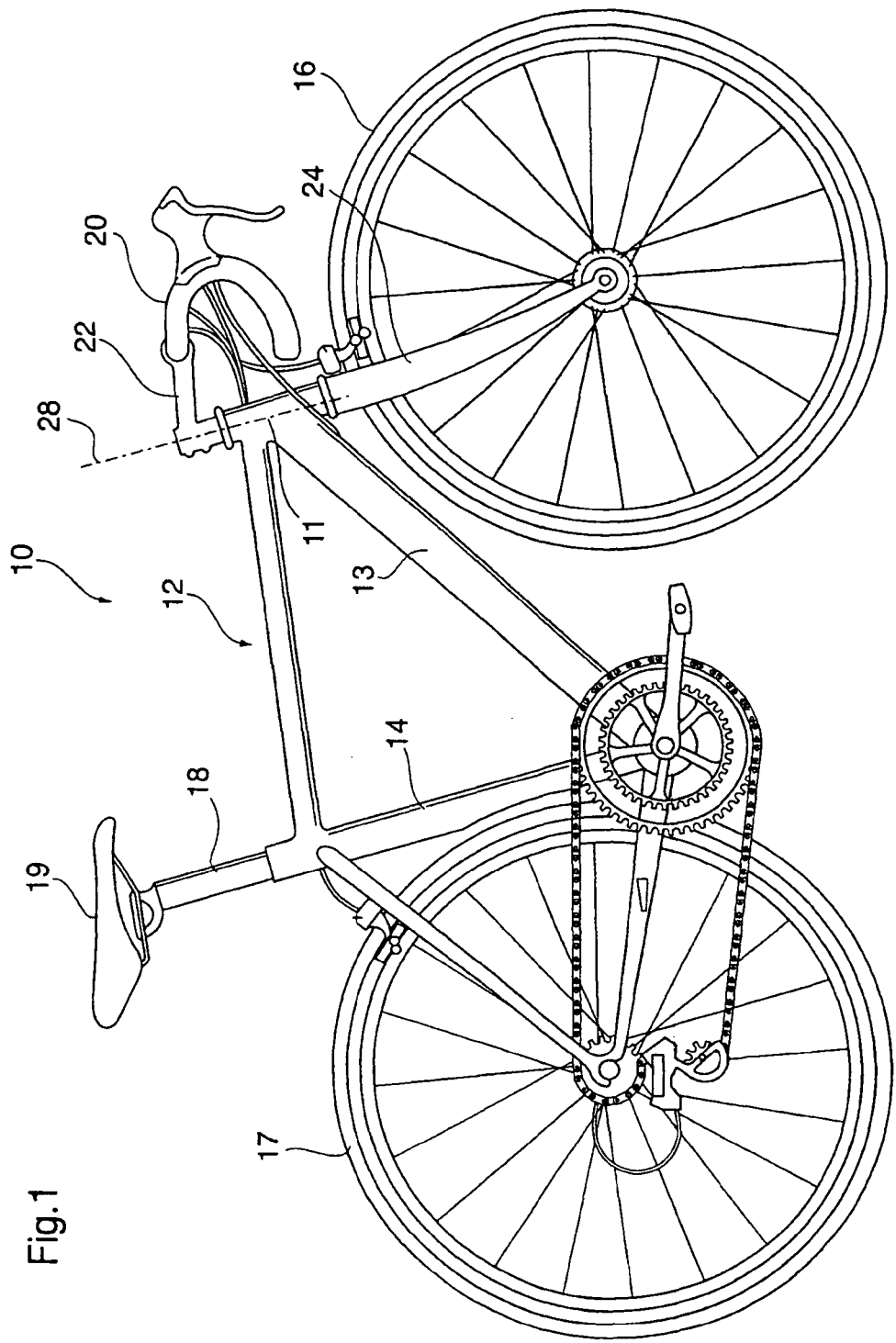
FIG. 1 is a side view of a bicycle.

FIG. 1 is a side view of the bicycle 10. The bicycle 10 has a frame comprising a head tube 11, a top tube 12, down tube 13 and a seat tube 14. Each of the tubes is connected to one another to form a substantially closed mainframe loop. A seat post 18 supports a seat 19 at an upper end of the seat tube 14.

A fork 21 is rotatably coupled to the head tube 11 and extends through the head tube 11 carrying at an upper end the handlebars 20. The fork 21 splits into a pair of fork arms 24 which support a front wheel 16.

An axis 28 runs longitudinally through the fork 21.

FIG. 2 is an exploded partial perspective view of the upper portions of the fork 21 and the handlebar stem 22. The fork 21 comprises a bicycle fork steerer tube 30 with an upper end portion 31 and a lower end portion 32, a fork crown 23 and fork arms 24. The bicycle fork steerer tube 30 fits inside the head tube 11 of the bicycle 10. The handlebar stem 22 is clamped to the upper end portion 31 of the bicycle fork steerer tube 30 by clamp 26 after the bicycle fork steerer tube 30 has been placed inside the head tube 11.

FIG. 3 is a perspective view of a short length of the lower end 32 of the composite bicycle fork steerer tube 30 shown in FIG. 2. The composite bicycle fork steerer tube 30 is disposed about a longitudinal axis 28 and has a generally cylindrical inside surface 33 and a generally cylindrical outside surface 34.

As schematically shown in FIG. 3, the lower end portion 32 of the bicycle fork steerer tube 30 includes a tubular layer 37 of composite material including different layers of elongated fibres some of which fibres are schematically shown to be visible through the polymer matrix. The fibres may preferably be of glass, Kevlar, carbon or other suitable material. The fibres are placed in different orientations with respect to the longitudinal axis 28 of the tube. In particular, the fibres of the tube in FIG. 3 are selected for illustration to be placed at but three orientations, namely to be placed longitudinally, circumferentially about the tube normal to the axis 28 or in a helix about the axis 28 so as to be at 45° to the axis 28.

The fibres are placed in the different orientations since the physical properties of composite materials are generally not isotropic (independent of direction of an applied force) in nature, but rather are typically orthotropic (different depending on the direction of the applied force or load). Accordingly, the fibres in composite materials are placed in different relative quantities in different directions depending on the desire to provide relatively the resulting bending strength, hoop strength or torsion strength.

When fibres are aligned with the axis 28 in a longitudinal direction, the bending strength of the tube is increased.

When fibres are placed in circumferentially around the tube normal to the axis 28, the hoop strength of the tube is increased.

When fibres are placed in a helix at a 45° angle or other angles to the axis 28, the torsion strength of the tube is increased.

The directions of the fibres and the relative quantity of the fibres in each direction are adjusted depending on the strength requirements for the tube. For example, if a given bicycle fork steerer tube desired to have increased hoop strength, additional fibres may be placed circumferentially about the tube normal to the longitudinal axis.

In contrast to the composite materials that are orthotropic, metals including aluminums, steel and nickel have isotropic properties and typically have the same stiffness regardless of the direction or orientation of the applied force and/or moments.

The lower end portion 32 of the steer tube 30 in FIG. 3, is also shown with a portion 35 cut away.

FIG. 4 is a perspective view of a short length of the upper end portion 31 of the composite bicycle fork steerer tube 30 shown in FIG. 2. The upper end portion 31 of the composite bicycle fork steerer tube 30 includes the composite tubular layer 37 identical to that of lower end portion 32. The upper end portion 31 has an additional tubular layer 36 of plating overlying the radially outer surface of the composite tubular layer 37. The upper end portion 31 thus has an inner composite tubular layer 37 and an outer plating tubular layer 36.

FIG. 6 is a top view of the bicycle fork steerer tube of FIG. 4 through the upper end portion 31 best showing the composite tubular layer 37 and the relatively thin plating tubular portion 36.

The thickness of the plating tubular layer 36 may preferably be very small, for example without limitations in the range from one thousandths of an inch to 40 thousandths of an inch; preferably at least 5 thousandths of an inch.

The plating tubular layer 36 of the bicycle fork steerer tube 30 is composed of a metal or metal alloy that is coupled to the outside surface while not limited, preferably the metal tubular layer 36 may be coupled to composite tubular layer 37 by a process as disclosed in the U.S. patent publication No. 2006/0160636, published Jul. 20, 2006. The plating tubular layer 36 provides protection for the outside surface 34 against damage as due to the strength and hardness of the metal or metal alloy.

The plating tubular layer 36 provides resistance against wear. In particular, a bicycle fork steerer tube 30 placed within the head tube 11 of a bicycle 10 may wear against the inside of the head tube when rotated. Accordingly, the plain tubular layer 36 can provide the additional wear protection.

The plating tubular layer 36 can provide additional stiffness and strength in each direction and orientation, which compliments the composite tubular layer 37 of the bicycle fork steerer tube 30.

The combination of the composite tubular layer 37 and the plating tubular layer 36 can provide the bicycle fork steerer tube to be made with desired optimal properties. For example, it is the combination of the fibres of the composite tubular layer 37, which can be placed in a variety of directions, including axially, in a helix or circumferentially, and the plating tubular layer 36, which creates the bicycle fork steerer tube with the strength in the required orientations. For example, if a given bicycle fork steerer tube is desired to have increased hoop strength without the desire of increased bending strength and torsion strength, the composite tubular layer 37 may be composed of fibre placed in the circumferential direction normal to the axis 28 to provide the additional required hoop strength. The composite tubular layer 37 may not need to have fibres placed in the axial direction or in a helix insofar as the required bending and torsion strength may be provided by the plating tubular layer 36.

The composite tubular layer 37 may be plated with the outer plating tubular layer 36 using a variety of manufacturing techniques including without limitation sputtering, laser ablation, inert gas condensation, oven evaporation spray conversion pyrolysis, flame hydrolysis, high energy milling, sol gel disposition and electrodeposition, dip coating, vapour disposition, vacuum deposit and electrostatic spray. These manufacturing processes are known to a person of ordinary skill in the art and many are disclosed or referred to in the U.S. patent publication No. 2006/0160636, published Jul. 20, 2006.

Materials that are useful for the plating of fibre composite include (1) metals selected from the group of Ag, Au, Cd, Co, Cr, Cu, Fe, Ir, Ni, Pb, Pd, Pt, Rh, Sn, and Zn; (2) metal alloys formed of these metals; and (3) metal alloys formed of these material along with the alloying component selected from the group of B, C, Mn, Mo, P, S, Si, and W. Further disclosure can be found in the U.S. patent publication No. 2006/0160636, published Jul. 20, 2006.

The plating tubular layer 36 may extend the entire length of the bicycle fork steerer tube 30 however, does not need to extend the entire length of the bicycle fork steerer tube 30 and may only need to be applied at certain locations depending on the requirements of the bicycle fork steerer tube.

For example, in the arrangement where the handlebars 20 are attached to the bicycle fork steerer tube 30 plated tubular layer 36 via a clamp 26 as shown in FIG. 2 may only be required where the clamp 26 engages the bicycle fork steerer tube 30 as shown in FIG. 2. Accordingly, it is not necessary for the layer of plating 36 to extend the full length of the bicycle fork steerer tube 30.

While FIG. 2 shows the layer of plating 36 only on the upper end portion 31, the plating tubular layer 36 may extend the entire length of the bicycle fork steerer tube. Furthermore, the plating tubular layer 36 may vary in the thickness depending on the desires for the bicycle fork steerer tube.

FIG. 7 illustrates a schematic perspective view of a short length of a plated composite bicycle fork steerer tube 38 similar to FIG. 4 with a third additional internal tubular layer 39, preferably composed of metal or metal alloy, whether as a preferred rigid member or as another plated tubular layer.

The invention claimed is:

1. A bicycle fork having a cylindrical steerer tube, a crown and a pair of fork arms for mounting of a front wheel therebetween
   the crown having the steerer tube extending upwardly therefrom to an upper distal end of the steerer tube,
   the crown having the fork arms extending downwardly therefrom to lower distal ends of the fork arms,
   the steerer tube adapted to extend through a bicycle frame to rotatably couple the fork to the bicycle frame,
   characterized by:
   the steerer tube having an inner tube of fibre composite material and
   a plated layer of metal circumferentially about a section of the inner tube forming an exterior surface of the steerer tube over the section of the inner tube,
   wherein the plated layer of metal on the steerer tube has a thickness between 0.001 inches and 0.04 inches.

2. The bicycle fork as claimed in claim 1 wherein the steerer tube has proximate the upper distal end an upper clamp portion adapted for engagement by a clamp mechanism of a bicycle handlebar and the steerer tube has proximate the crown a lower journal portion adapted and to extend through the bicycle frame and be journalled therein, the plated layer of metal circumferentially about at least one of the upper clamp portion and the lower journal portion.

3. The bicycle fork as claimed in claim 2 wherein the plated layer of metal is circumferentially about the upper clamp portion.

4. The bicycle fork as claimed in claim 2 wherein the plated layer of metal is circumferentially about the lower journal portion.

5. The bicycle fork as claimed in claim 3 wherein the plated layer of metal on the steerer tube has a thickness between 0.001 inches and 0.01 inches.

6. The bicycle fork as claimed in claim 4 wherein the plated layer of metal on the steerer tube has a thickness between 0.001 inches and 0.01 inches.

7. The bicycle fork as claimed in claim 1 wherein the fibre composite is selected from a group consisting of one or more of glass, Kevlar and carbon.

8. The bicycle fork as claimed claims 7 wherein the plated layer of metal is selected from a group consisting of one or more of Ag, Au, Cd, Co, Cr, Cu, Fe, Ir, Ni, Pb, Pd, Pt, Rh, Sn, and Zn.

9. The bicycle fork as claimed in claim 8 wherein the plated layer of metal has the alloying component selected from a group consisting of B, C, Mn, Mo, P, S, Si, and W.

10. The bicycle fork as claimed in claim 3 wherein the fibre composite is selected from a group consisting of one or more of glass, Kevlar and carbon.

11. The bicycle fork as claimed claims 10 wherein the plated layer of metal is selected from a group consisting of one or more of Ag, Au, Cd, Co, Cr, Cu, Fe, Ir, Ni, Pb, Pd, Pt, Rh, Sn, and Zn.

12. The bicycle fork as claimed in claim 11 wherein the layer of metal has the alloying component selected from a group consisting of B, C, Mn, Mo, P, S, Si, and W.

13. The bicycle fork as claimed in claim 2 wherein the inner tube has an internal surface and a second layer of metal circumferentially about a section of the internal surface of the inner tube.

14. The bicycle fork as claimed in claim 13 wherein the second layer of metal on the steerer tube has a thickness between 0.001 inches and 0.04 inches.

15. The bicycle fork as claimed in claim 13 wherein at least one of the layer of metal and the second layer of metal on the steerer tube has a thickness between 0.001 inches and 0.01 inches.

16. The bicycle fork as claimed in claim 4 wherein the crown is fibre composite material and a plated layer of metal extends over the section of the crown forming an exterior surface of the steerer tube over the section of the crown.

17. A bicycle fork having a cylindrical steerer tube, a crown and a pair of fork arms for mounting of a front wheel therebetween the crown having the steerer tube extending upwardly therefrom to an upper distal end of the steerer tube,
the crown having the fork arms extending downwardly therefrom to lower distal ends of the fork arms;
the steerer tube having proximate the upper distal end an upper clamp portion adapted for engagement by a clamp mechanism of a bicycle handlebar,
characterized by:
the steerer tube having an inner tube (37) of fibre composite material;
the inner tube is plated with a layer of metal circumferentially about a section of the upper clamp portion of the inner tube (37) forming an exterior surface the steerer tube over the upper clamp portion,
wherein the plated layer of metal on the steerer tube has a thickness between 0.001 inches and 0.04 inches.

18. A bicycle comprising a bicycle frame, a front fork and a handlebar;

the fork having a cylindrical steerer tube, a crown and a pair of fork arms for mounting of a front wheel therebetween,
the crown having the steerer tube extending upwardly therefrom to an upper distal end of the steerer tube,
the crown having the fork arms extending downwardly therefrom to lower distal ends of the fork arms;
the steerer tube extending through the bicycle frame to rotatably couple the fork to the bicycle frame,
the steerer tube above the crown having a lower journal portion and an upper clamp portion;
the steerer tube extending through a bicycle frame with the lower journal portion of the steerer tube journalled in the bicycle frame to rotatably couple the fork to the bicycle frame,
the upper clamp portion extending upwardly past the bicycle frame;
the handlebar having a clamp mechanism for engagement circumferentially about the upper clamp portion of steerer tube;
the clamp mechanism removably securing the handlebar to the steerer tube against relative rotation and against removal by applying forces to the exterior surface of the steerer tube about the upper clamp portion,
the steerer tube having an inner tube of fibre composite material and
a plated layer of metal circumferentially about a section of at least one of the upper clamp portion and the lower journal portion of the inner tube forming an exterior surface of the steerer tube over the section of the inner tube;
wherein the plated layer of metal on the steerer tube has a thickness between 0.001 inches and 0.04 inches.

19. The bicycle fork as claimed in claim 17 wherein the plated layer of metal on the steerer tube has a thickness between 0.001 inches and 0.01 inches.

20. The bicycle as claimed in claim 18 wherein the plated layer of metal on the steerer tube has a thickness between 0.001 inches and 0.01 inches.

* * * * *